United States Patent
Berggren (10) Patent No.: US 8,320,234 B2
(45) Date of Patent: Nov. 27, 2012

(54) METHOD OF GENERATING AND DETECTING SYNCHRONIZATION SIGNALS

(75) Inventor: Fredrik Berggren, Upplands-Vasby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 12/700,947

(22) Filed: Feb. 5, 2010

(65) Prior Publication Data

US 2010/0135150 A1   Jun. 3, 2010

Related U.S. Application Data

(63) Continuation of application No. PCT/CN2007/070491, filed on Aug. 15, 2007.

(51) Int. Cl.
*H04J 11/00* (2006.01)
(52) U.S. Cl. ........................................................ 370/210
(58) Field of Classification Search .................. None
See application file for complete search history.

(56) References Cited

U.S. PATENT DOCUMENTS

| | | | |
|---|---|---|---|
| 2001/0003446 A1* | 6/2001 | Takafuji | 345/98 |
| 2003/0198310 A1* | 10/2003 | Fanson et al. | 375/371 |

FOREIGN PATENT DOCUMENTS

| | | |
|---|---|---|
| CN | 1691659 A | 11/2005 |
| DE | 10048348 A1 | 4/2002 |
| WO | 2006/090742 A1 | 8/2006 |
| WO | 2007/082408 A1 | 7/2007 |

OTHER PUBLICATIONS

Written opinion of corresponding PCT Patent Application No. PCT/CN2007/070491, mailed on May 22, 2008, 7 pages total.
Zhongshan Zhang et al.: "Joint frame synchronization and frequency offset Estimationin OFDM systems," IEEE Transactions on Broadcasting, vol. 51, No. 3, Sep. 2005, 6 pages total.
Huawei, "P-SCH sequences", TSG RAN WG1 meeting #49, R1-0172321, Kobe, Japan, May 7-11, 2007, 6 pages total.
Huawei, "Optimised P-SCH sequences", TSG RAN WG1 meeting #49bis, R1-072896, Orlando, USA, Jun. 25-29, 2007, 8 pages total.

* cited by examiner

*Primary Examiner* — Xavier S. Wong
*Assistant Examiner* — Leon Andrews (57) ABSTRACT

A synchronization signal is generated by performing a circular time shift on a centrally symmetric signal, and the circular time shift is performed so that the synchronization signal is centrally asymmetric. The detection of the synchronization signal is then performed by utilizing the symmetries of the synchronization signal to reduce computation complexity of the detection.

20 Claims, 3 Drawing Sheets

Fig.6

METHOD OF GENERATING AND DETECTING SYNCHRONIZATION SIGNALS

CROSS-REFERENCE TO RELATED APPLICATION

This application is a continuation of International Application No. PCT/CN2007/070491, filed on Aug. 15, 2007, which is hereby incorporated by reference in its entirety.

FIELD OF THE TECHNOLOGY

The present disclosure relates generally to methods of generation and detection of a synchronization signal in a telecommunication system.

The present disclosure also relates to a transmitter, a receiver, a telecommunication system, a computer program and a computer program product for implementing the methods.

BACKGROUND

In a radio communication system, when setting up radio access of a mobile terminal to a cellular wireless system, the mobile terminal has to be synchronized with the cellular wireless system. To achieve synchronization, one of the procedures to be performed is to obtain the symbol timing synchronization. This is typically done by letting the base station transmit a synchronization signal. The receiver of this synchronization signal, i.e. a mobile terminal, can then detect the symbol timing by correlating the received signal with a replica of the transmitted signal, creating a correlation peak at the correct timing location of the synchronization signal. Due to the many multiplications involved in the correlation procedure, this procedure is regarded as very computationally expensive and it is desirable to reduce this effort.

Synchronization between a base station and a mobile terminal has to be performed in all types of radio communication systems and for all types of information carrying techniques, multi-carrier or single-carrier techniques, such as OFDM, FDMA, MC-CDMA and the like. In this description, the present disclosure will be exemplified in a 3rd Generation Partnership Project (3GPP) Long Term Evolution (LTE) system using OFDM. However, as is clear to a skilled person, the present disclosure is not limited to this exemplification and may be utilised in essentially any radio communication system using any information carrying technique.

In 3GPP LTE, the Primary Synchronization Channel (P-SCH) signals are obtained from any of three different Zadoff-Chu (ZC) sequences. An OFDM signal is then generated from an Inverse Discrete Fourier Transform (IDFT) of a frequency domain defined ZC sequence, mapped on the used subcarriers, excluding the DC subcarrier. The receiver detects, by correlation with the three replica signals, which ZC sequence was used, and the timing synchronization of the signal.

In prior art, the ZC sequences is proposed to map on the subcarriers so that time domain centrally symmetric synchronization signals are produced. The receiver may then, when correlating the synchronization signals with a replica signal, utilize the centrally symmetric signal property to reduce the multiplication complexity by adding every pair of received centrally symmetric samples before multiplication with the corresponding value of the replica signal. By this, one multiplication per each pair of symmetric samples is avoided. Thus, a reduction of the computational complexity of about 50% can be achieved, compared to a conventional implementation of the correlation.

In addition, for odd-length ZC sequences which are mapped to provide centrally symmetric signals, it is possible to obtain two synchronization signals (from two different ZC sequences), which are complex conjugated versions of each other. Thereby, in the receiver, the detection of the two signals can be implemented with a multiplication complexity of just one of the signals. Hence, the centrally symmetric property of the synchronization signal is in a twofold way useful for implementing low-complex detection.

By the use of centrally symmetric signals, a reduction of the number of multiplications, obtained by adding symmetric samples, is only feasible when the whole synchronization signal is used in the correlation. Such a full-length correlation procedure is typically used when the frequency offsets are small. Small frequency offsets can be assumed for, for example, neighbor cell search.

On the other hand, when the frequency offsets are large, which can be assumed for, for example, initial cell search, the received signal becomes distorted. Therefore, a full-length correlation does not give a good result for large frequency offsets. For this case, the correlation has to be computed on smaller parts of the synchronization signal and the correlation values from the different parts are then non-coherently added.

When correlations are computed for parts of the synchronization signal, the complexity reduction may not be achieved as efficiently as for the full-length correlation of the centrally symmetric signal in the prior art solutions, since it is not sure that each of the samples within such a part of the signal will have a corresponding symmetric sample to be added together with before the multiplication. Thus, in the prior art solutions, there is a computation complexity problem present for correlations being performed on shorter parts than the whole length of the synchronization signal.

SUMMARY

The present disclosure aims to provide a synchronization signal, which offers reduction of multiplications, both for partial correlation and full-length correlations of a received version of the synchronization signal. The present disclosure thus aims to provide a synchronization procedure being less computationally complex than the synchronization procedures in the prior art.

This disclosure provides a method of generating a synchronization signal for use in a telecommunication system. In the method, the synchronization signal is generated by performing a circular time shift on a centrally symmetric signal, and the circular time shift is performed such that the synchronization signal is centrally asymmetric.

This disclosure also provides a method of detecting a synchronization signal in a telecommunication system. In the method, the detection utilizes symmetries of a received version of the synchronization signal to be detected, the synchronization signal having been generated by performing a circular time shift on a centrally symmetric signal, such that the synchronization signal is centrally asymmetric.

This disclosure also provides a computer program, including code means. When the code means are run in a computer, the running of the code means causes the computer to execute the above mentioned methods.

This disclosure also provides a computer program product including a computer readable medium and the above mentioned computer program, wherein the computer program is included in the computer readable medium.

This disclosure also provides a base station in a telecommunication system arranged for generating a synchronization signal, the base station being arranged for generating the synchronization signal by performing a circular time shift on a centrally symmetric signal, such that the synchronization signal is centrally asymmetric.

This disclosure also provides a mobile terminal in a telecommunication system arranged for detecting a synchronization signal, the mobile terminal being arranged for, when performing the detection, utilizing symmetries of a received version of the synchronization signal to be detected, the synchronization signal having been generated by a base station arranged to perform a circular time shift on a centrally symmetric signal, such that the synchronization signal is centrally asymmetric.

This disclosure also provides a telecommunication system including at least a base station and a mobile terminal. The base station and the mobile terminal are arranged to be synchronized with each other by the use of a synchronization signal, where the synchronization signal is transmitted by the base station and is detected by the mobile terminal The arrangement of the base station and the mobile terminal are described as follows:

the base station is arranged for generating the synchronization signal by performing a circular time shift on a centrally symmetric signal, such that the synchronization signal is centrally asymmetric, and the mobile terminal is arranged for, when performing the detection, utilizing symmetries of a received version of the synchronization signal to be detected.

The methods and apparatus according to the present disclosure are characterized in that a synchronization signal is generated, which has symmetric shape that can be utilized for computational complexity reduction both for full-length correlation and partial correlation in a receiver of the transmitted synchronization signal.

More in detail, the centrally asymmetric synchronization signal of the present disclosure has, within its parts, symmetric sample pairs that can be added before being multiplied with a replica signal in the correlation process in the receiver. That is, the shape of the synchronization signal according to the present disclosure makes it possible to find such symmetric sample pairs within parts of the synchronization signal, which is very advantageous because large frequency offsets often forces the receiver to perform partial correlations.

The synchronization signal according to the present disclosure is generated by performing a circular time shift on a centrally symmetric signal, thereby generating a centrally asymmetric synchronization signal. In this way, the symmetry characteristics of the centrally symmetric signal makes shifting of the signal very easy to perform and also ensures that the resulting synchronization signal has a favorable shape for utilizing its symmetries.

Further, according to an embodiment of the present disclosure, a synchronization signal having been generated by a circular time shift of a centrally symmetric signal, the time shift having a length of a quarter of the length of the signal, is used. By this, a centrally asymmetric signal, having symmetric parts, essentially constituting the halves of the signal, is generated.

For this embodiment of the disclosure, a partial correlation on two consecutive parts of the synchronization signal, each part essentially constituting half of the synchronization signal, can be performed, while utilizing the fact that essentially all of the samples in each of the parts have corresponding symmetric samples. Thus, essentially each one of the samples within each of the parts can be added with a corresponding symmetric sample before being multiplied with a replica signal. Thereby, essentially 50% of the multiplications can be avoided for partial correlation.

For the embodiment of the disclosure having a shift of a quarter of the length of the signal, also the computation complexity reduction for full-length correlation can avoid essentially 50% of the multiplications.

In a more general embodiment of the disclosure, a circular time shift of a general length is performed. For this more general case, partial correlations can utilize symmetric pairs of samples, within parts of the generated centrally asymmetric synchronization signal, for reducing correlation computation complexity.

In an embodiment of the present disclosure, the synchronization signal is constructed so that its shape is maintained in samples of the synchronization signal being sampled at a sampling rate lower than the sample rate of the generated synchronization signal. Thus, the synchronization signal is generated so that if it would be downsampled in a receiver, the favorable shape of the signal would appear in the downsampled version. In this way, a correlator of a suitable length can be used in the receiver, because the symmetries needed for the complexity reduction is maintained in the downsampled version of the signal. Using a correlator of shorter length has further the advantage of lowering the computation complexity of the correlation.

Detailed exemplary embodiments and advantages of the methods and apparatus of generating and detecting a synchronization signal according to the disclosure are described with reference to the appended drawings illustrating some exemplary embodiments.

DETAILED DESCRIPTION

Hereafter, the present disclosure is exemplified for a 3GPP LTE system using OFDM. However, as stated above, the inventive idea of the present disclosure may be utilised in essentially any radio communication system using any information carrying technique, as is clear to a skilled person.

In prior art solutions, centrally symmetric synchronization signals have been designed. A discrete OFDM signal $\tilde{s}_u(k)$, $k=0, 1, \ldots, N-1$ is obtained from an N-point IDFT of N Fourier coefficients $\tilde{H}_u(l)$, $l=0, 1, \ldots, N-1$, as:

$$\tilde{s}_u(k) = \frac{1}{\sqrt{N}} \sum_{l=0}^{N-1} \tilde{H}_u(l) W_N^{-kl}, \qquad \text{(Eq. 1)}$$

with $W_N = \exp(-j2\pi/N)$.

It has been shown that, if $\tilde{H}_u(l) = \tilde{H}_u(N-1)$, then the signal $\tilde{s}_u(k)$ is centrally symmetric, i.e., $\tilde{s}_u(k) = \tilde{s}_u(N-k)$, or the like.

As is clear for a person skilled in the art, there are a number of possible definitions for centrally symmetric signal shapes. For instance, a signal y(k) may be defined to be centrally symmetric if y(k)=y(N−k), if y(k)=y(N−1−k), or if the signal y(k) fulfils any other condition showing essentially that the signal y(k) contains two concatenated halves, each half being a reversed version of the other half. Also, a signal y(k) may be defined to be complex conjugate centrally symmetric if y(k)= y(N−k)* (where "*" is a complex conjugate operator), if y(k)=y(N−1−k)*, or if the signal y(k) fulfils any other condition showing essentially that the signal y(k) contains two concatenated halves, each half being a reversed complex conjugated version of the other half. In this document, the term centrally symmetric includes all of these definitions for central symmetry.

Correspondingly, a signal y(k) is in this document said to be centrally asymmetric if it does not fulfil any of these definitions for central symmetry. For instance, a signal y(k) is thus centrally asymmetric if y(k)≠y(N−k), y(k)≠y(N−1−k), y(k)≠y(N−k)*, or y(k)≠y(N−1−k)*.

The Fourier coefficients are in prior art obtained from a frequency domain number sequence $d_u(n)$, n=0, 1, ..., 61, which is mapped on subcarriers according to:

$$\tilde{H}_u(l) = \begin{cases} 0, & l = 0 \\ d_u(l+30), & l = 1, 2, \ldots, 31 \\ d_u(l-N+31), & l = N-31, \ldots, N-1 \\ 0, & \text{elsewhere.} \end{cases} \quad \text{(Eq. 2)}$$

Figure 1:
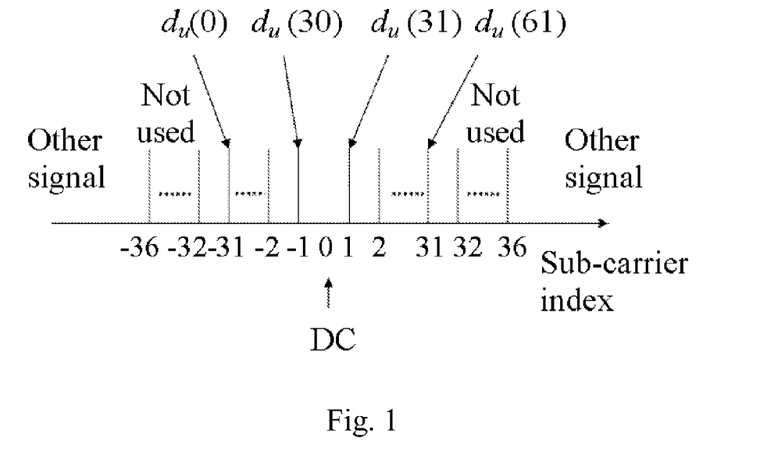
FIG. 1 shows mapping of a number sequence on subcarriers.

This mapping of the number sequence on the subcarriers is illustrated in FIG. 1.

The number sequence $d_u(n)$ is obtained from a punctured ZC sequence of length 63, $$d_u(n) = \begin{cases} W_{63}^{un(n+1)/2} & n = 0, 1, \ldots, 30 \\ W_{63}^{u(n+1)(n+2)/2} & n = 31, 32, \ldots, 61, \end{cases} \quad \text{(Eq. 3)}$$

where u=25, u=29, or u=34, which are relatively prime to 63.

At the receiver, the symmetric samples can then be added prior to multiplication and the correlations between the received signal r(m), m=0, 1, ... and the replica signal can be computed in correspondence with, for N being an odd integer:

$$R_u(m) = \left| \sum_{k=0}^{N-1} r(m+k)\tilde{s}_u(k)^* \right| \quad \text{(Eq. 4)}$$

$$= \left| r(m)\tilde{s}_u(0)^* + \sum_{k=1}^{(N-1)/2} (r(m+k) + r(m+N-k))\tilde{s}_u(k)^* \right|$$

and for N being an even integer:

$$R_u(m) = \left| \sum_{k=0}^{N-1} r(m+k)\tilde{s}_u(k)^* \right| \quad \text{(Eq. 5)}$$

$$= \left| r(m)\tilde{s}_u(0)^* + \sum_{k=1}^{N/2-1} (r(m+k) + r(m+N-k))\tilde{s}_u(k)^* + r(m+N/2)\tilde{s}_u(N/2)^* \right|.$$

Hence, a total number of (N+1)/2 and N/2+1 multiplications are needed for these correlations, respectively.

If the centrally symmetric synchronization signal has two concatenated halves, where one of the halves is a reversed complex conjugated version of the other half, the complex conjugated half has to be complex conjugated before adding this half with the other half before the multiplication in the receiver.

As stated above, the addition of symmetric samples performed in the prior art solutions does only work efficiently when a full-length correlation is performed, including the whole synchronization signal in the correlation. A full-length correlation can only be performed with a good result when the frequency offset is small. In some situations, for instance for initial cell search, the frequency offset is instead typically large. For such a case, correlations must be calculated on (at least) two consecutive parts of the synchronization signal, and the correlation values from the different parts are then non-coherently added.

Often, correlations are calculated for a first and a second half of the synchronization signal. When this is the case, a centrally symmetric shape of the synchronization signal can not be utilized to reduce the number of multiplications in the correlation computations, since there are no pairs of symmetric samples within each of the two halves.

Figure 2:
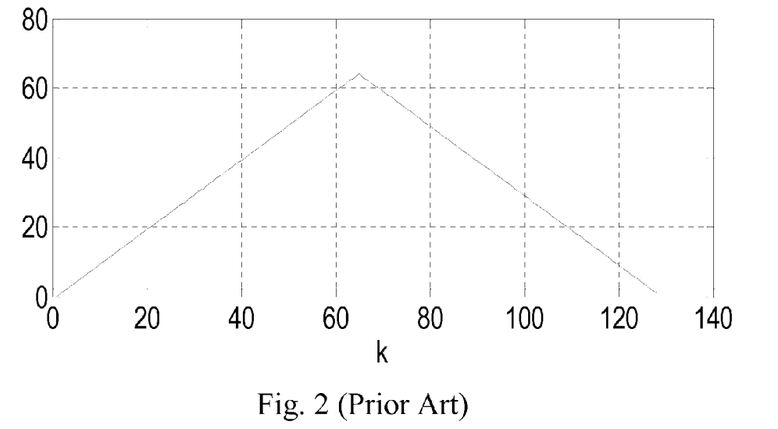
FIG. 2 shows a centrally symmetric synchronization signal in prior art.

This problem is illustrated in FIG. 2, which shows a plot of a centrally symmetric synchronization signal of length 128. It is clear from the plot in FIG. 2 that no multiplication savings can be done if partial correlations of the two halves of this signal are performed, separately, since there is no symmetry within the first or last 64 samples of the signal.

In order to solve this problem, the present disclosure aims to produce a synchronization signal, which makes a reduction of multiplications possible for both partial correlation and full-length correlation of the synchronization signal with a replica signal.

Figure 3:
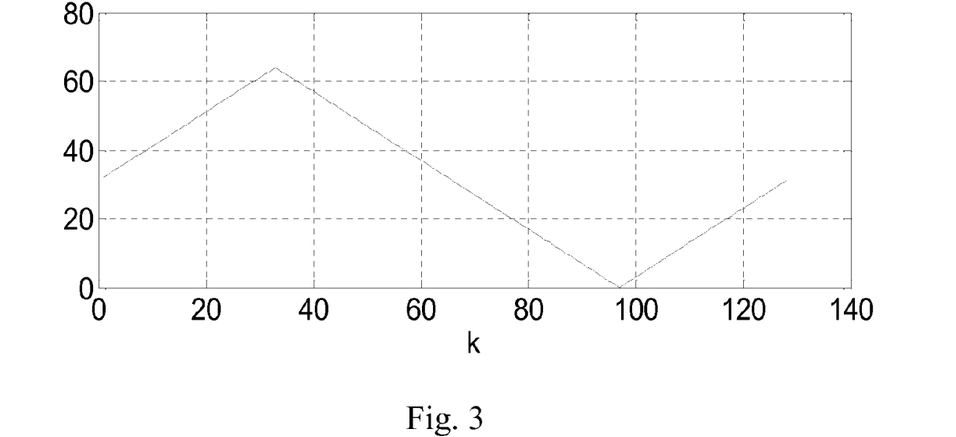
FIG. 3 shows a centrally asymmetric synchronization signal according to the present disclosure.

FIG. 3 shows a plot of an example of a synchronization signal of length 128 according to an embodiment of the present disclosure. The synchronization signal according to this embodiment of the present disclosure is centrally asymmetric, but is symmetric within the halves of its length, i.e., within the first 64 and the last 64 samples.

If a typical partial correlation is used, correlations are computed independently on the first 64 and the last 64 samples of the signal. With this type of signal, being symmetric on both halves of the signal but not being centrally symmetric, there are symmetric samples on both halves of the signal. The number of multiplications can thus be reduced by adding symmetric samples, regardless of if half- or full-length correlations are used.

The synchronization signal of the embodiment of the present disclosure thus solves the computation complexity problem of the prior art solutions, since symmetries of the two halves, for which correlations are calculated, separately, can be utilized.

FIG. 3 shows, for illustrative reasons, a plot of a synchronization signal being useful in a typical situation, for which correlations are calculated for each half of the synchronization signal. However, the present disclosure may, as will be described below, be generalized so as to be used for other types of partial correlations.

Moreover, from studying the plots in FIG. 2 and FIG. 3, it can be concluded that the synchronization signal of the present disclosure, shown in FIG. 3, can be obtained by performing a cyclic shift of 32 samples on the centrally symmetric signal shown in FIG. 2. A synchronization signal according to the present disclosure is a circularly time shifted version of a centrally symmetric signal, and thereby, the synchronization signal is centrally asymmetric but has symmetries on parts of the synchronization signal.

Thus, to achieve a synchronization signal that makes it possible to reduce computation complexity for partial correlations, one suitable synchronization signal design is to perform a circular time shift on a centrally symmetric signal. In the example illustrated in FIG. 3, a circular time shift by a quarter of the length of the signal is used to achieve the wanted correlation properties.

Mathematically, a generation of a synchronization signal $s_u(k)$ by the use of a circular time shift according to the illustrated example of the embodiment may be analysed by considering a centrally symmetric signal $\tilde{s}_u(k)=\tilde{s}_u(N-k)$, $k=0, 1, \ldots, N-1$, which is also periodic $\tilde{s}_u(k)=\tilde{s}(N+k)$, $k=0, 1, \ldots, N-1$. If $\tilde{s}_u(k)$ is an OFDM signal, the periodicity follows directly from the IDFT.

Assume that the centrally symmetric signal $\tilde{s}_u(k)$ is shifted by a circular time shift of $\lceil N/4 \rceil$ steps, so that $s_u(k)=\tilde{s}_u(k+\lceil N/4 \rceil)$. $\lceil x \rceil$ denotes here the smallest integer equal to or greater than x.

Alternatively, the signal can be shifted in the other direction, $s_u(k)=\tilde{s}_u(k-(\lceil N/4 \rceil-1))$, to obtain a similar symmetry. However, for conciseness, the signal analysis is hereafter only included for $s_u(k)=\tilde{s}_u(k+\lceil N/4 \rceil)$.

From the central symmetry of $\tilde{s}_u(k)$, it follows that for $k=0, 1 \ldots, N-2\lceil N/4 \rceil$:

$$s_u(N-2\lceil N/4 \rceil - k) = \tilde{s}_u(N - (k + \lceil N/4 \rceil)) \quad \text{(Eq. 6)}$$
$$= \tilde{s}_u(k + \lceil N/4 \rceil)$$
$$= s_u(k)$$

and for $k = N - 2\lceil N/4 \rceil + 1, \ldots, N-1:$ (Eq. 7)

$$s_u(2N - 2\lceil N/4 \rceil - k) = \tilde{s}_u(2N - (k + \lceil N/4 \rceil))$$
$$= \tilde{s}_u(N + k + \lceil N/4 \rceil)$$
$$= s_u(N + k)$$
$$= s_u(k).$$

Thus:

$$s_u(k) = \begin{cases} s_u(N-2\lceil N/4 \rceil - k), & k = 0, 1, \ldots, N-2\lceil N/4 \rceil \\ s_u(2N-2\lceil N/4 \rceil - k), & k = N-2\lceil N/4 \rceil + 1, \ldots, N-1. \end{cases} \quad \text{(Eq. 8)}$$

Consequently, by performing a circular time shift on a centrally symmetric signal by $\lceil N/4 \rceil$ steps, the signal of equation 8 is obtained.

Example 1

Some illustrative examples of the signal construction according to $s_u(k)=\tilde{s}_u(k+\lceil N/4 \rceil)$ are:
N=9: $\tilde{s}_u$=[0 1 2 3 4 4 3 2 1] ⇒ $s_u$=[3 4 4 3 2 1 0 1 2]
N=10: $\tilde{s}_u$=[0 1 2 3 4 5 4 3 2 1] ⇒ $s_u$=[3 4 5 4 3 2 1 0 1 2]
N=11: $\tilde{s}_u$=[0 1 2 3 4 5 5 4 3 2 1] ⇒ $s_u$=[3 4 5 5 4 3 2 1 0 1 2]
N=12: $\tilde{s}_u$=[0 1 2 3 4 5 6 5 4 3 2 1] ⇒ $s_u$=[3 4 5 6 5 4 3 2 1 0 1 2]

The circular time shift of the illustrated example can be performed directly in the time domain. When $\tilde{s}_u$ is an OFDM signal, the circular time shift can also be implemented in the frequency domain by modulating the Fourier coefficients which produce the centrally symmetric signal $\tilde{s}_u(k)$.

Assume that the Fourier coefficients $\tilde{H}_u(l), l=0, 1, \ldots, N-1$ generate a centrally symmetric signal $\tilde{s}_u(k)=\tilde{s}_u(N-k)$. Then, there are $$s_u(k) = \tilde{s}_u(k+\lceil N/4 \rceil) \quad \text{(Eq. 9)}$$
$$= \frac{1}{\sqrt{N}} \sum_{l=0}^{N-1} \tilde{H}_u(l) W_N^{-kl} W_N^{-l\lceil N/4 \rceil}$$
$$= \frac{1}{\sqrt{N}} \sum_{l=0}^{N-1} H_u(l) W_N^{-kl},$$

where $H_u(l)=\tilde{H}_u(l)W_N^{-l\lceil N/4 \rceil}$, which gives a signal according to equation 8.

In a more general embodiment of the present disclosure, circular time shifts of a general length d, of a centrally symmetric signal $\tilde{s}_u(k)$, are performed directly in the time domain in accordance with:

$$s_u(k)=\tilde{s}_u(k+d). \quad \text{(Eq. 10)}$$

where d is a positive or a negative integer such that the synchronization signal $s_u(k)$ is centrally asymmetric. For instance, for a positive and a negative circular time shift of a quarter of the length of the signal $\tilde{s}_u(k)$, as in the example given above, $d=\lceil N/4 \rceil$ and $d=-(\lceil N/4 \rceil-1)$.

Correspondingly, circular time shifts of a general length d are, according to an embodiment of the present disclosure, performed in the frequency domain by modulation of Fourier frequency coefficients, in accordance with:

$$s_u(k) = \frac{1}{\sqrt{N}} \sum_{l=0}^{N-1} H_u(l) W_N^{-kl}, \quad \text{(Eq. 11)}$$

where $H_u(l)=\tilde{H}_u(l)W_N^{-ld}$ and d is a positive or a negative integer such that the synchronization signal $s_u(k)$ is centrally asymmetric. The values of d for equation 11 correspond to the values stated above for equation 10.

According to an embodiment of the present disclosure, circular time shifts of general length are performed in the frequency domain by defining another number sequence $g_u(n)$, used for generating the synchronization signal $s_u(k)$.

According to this embodiment, the number sequence $g_u(n)$ is defined as:

$$g_u(n) = \begin{cases} W_L^{-d(n+33)} W_{63}^{un(n+1)/2} & n = 0, 1, \ldots, 30 \\ W_L^{-d(n-30)} W_{63}^{u(n+1)(n+2)/2} & n = 31, 32, \ldots, 61, \end{cases} \quad \text{(Eq. 12)}$$

where u is a number relatively prime to 63, $W_N=\exp(-j2\pi/N)$, $-L<d<L$ and $d \neq 0$, N is the length of the synchronization signal $s_u(k)$ being generated from $H_u(l)$, $N=m*L$, and m is an integer $\geq 1$.

When comparing this number sequence $g_u(n)$ with the number sequence $d_u(n)$ defined in equation 3, it can be seen that these number sequences are similar, but that $g_u(n)$ has a further multiplication with complex coefficient $W_L$.

According to this embodiment, the synchronization signal $s_u(k)$ is then generated by defining a centrally asymmetric set of discrete Fourier frequency coefficients $H_u(l)$, mapping the number sequence $g_u(n)$ on this set of centrally asymmetric set of discrete Fourier frequency coefficients, and then transforming these Fourier frequency coefficients $H_u(l)$ into a discrete time representation constituting synchronization signal $s_u(k)$.

The mapping is here performed in accordance with:

$$H_u(l) = \begin{cases} 0, & l=0 \\ g_u(l+30), & l=1,2,\ldots,31 \\ g_u(l-N+31), & l=N-31,\ldots,N-1 \\ 0, & \text{elsewhere}, \end{cases} \quad \text{(Eq. 13)}$$

where the length of the number sequence is 62, $g_u(n)$, $n=0, 1, \ldots, 61$, and N is the number of Fourier frequency coefficients.

This mapping of the number sequence $g_u(n)$ on the set of centrally asymmetric discrete Fourier frequency coefficients $H_u(l)$ is thus performed in a corresponding way as the mapping of the number sequence $d_u(n)$ on the centrally symmetric set of discrete Fourier frequency coefficient $\hat{H}_u(l)$, which is illustrated in FIG. 1.

For further reduction of computation complexity in practical applications, the length of the block that is taken as input to the correlator in the receiver, which is also the equivalent length of a matched filter being used, may be downsampled to a number less than N.

For example, it is envisioned that a correlator of length L=64 (i.e., a number independent of N) is used to detect the synchronization signal $s_u(k)$ when implementing the present disclosure. It is therefore desirable to be able to generate the circular time shift in the frequency domain, independently of N, and to obtain a signal that has the desired symmetry for a block of L samples.

Assume that there are Fourier coefficients such that $\tilde{H}_u(l) = \tilde{H}_u(L-l)$, $l=0, 1\ldots,L-1$ and $N=m\cdot L$, where $m>1$ is a positive integer. According to an embodiment of the present disclosure, exemplifying a circular time shift of a quarter of the length of the signal, by transmitting the signal:

$$s_u^{(N)}(k) = \frac{1}{\sqrt{N}} \sum_{l=0}^{L-1} \tilde{H}_u(l) W_N^{-kl} W_L^{-l\lceil L/4 \rceil}, \quad k=0,1,\ldots,mL-1, \quad \text{(Eq. 14)}$$

and defining:

$$\tilde{s}_u^{(L)}(k) = \frac{1}{\sqrt{L}} \sum_{l=0}^{L-1} \tilde{H}_u(l) W_L^{-kl}, \quad k=0,1,\ldots,L-1, \quad \text{(Eq. 15)}$$

A synchronization signal $s_u^{(N)}(k)$ being an upsampled $\lceil L/4 \rceil$-circular shifted version of $\tilde{s}_u^{(L)}(k)$ is obtained.

For $p=0, 1, \ldots, L-1$, the following is obtained:

$$\begin{aligned} s_u^{(N)}(mp) &= \frac{1}{\sqrt{N}} \sum_{l=0}^{L-1} \tilde{H}_u(l) W_L^{-pl} W_L^{-l\lceil L/4 \rceil} \\ &= \sqrt{L/N} \cdot \tilde{s}_u^{(L)}(p + \lceil L/4 \rceil) \\ &= \sqrt{L/N} \cdot s_u^{(L)}(p) \\ &= \begin{cases} \sqrt{L/N} \cdot s_u^{(L)}(L-2\lceil L/4 \rceil - p), & p=0,1,\ldots, L-2\lceil L/4 \rceil \\ \sqrt{L/N} \cdot s_u^{(L)}(2L-2\lceil L/4 \rceil - p), & p=L-2\lceil L/4 \rceil + 1,\ldots,L-1. \end{cases} \end{aligned} \quad \text{(Eq. 16)}$$

Hence, in the sampling points $mp$, $p=0, 1, \ldots, L-1$, according to this embodiment of the present disclosure, the block of L samples has the desired symmetry in the two halves of the synchronization signal. Therefore, the circular time shift can be implemented by multiplying the Fourier coefficients by $W_L^{-l\lceil L/4 \rceil}$, $l=0, 1, \ldots, L-1$. It should be noted though, that since $$s_u^{(N)}(k) = \tilde{s}_u^{(N)}\left(k + \frac{N}{L}\left\lceil\frac{L}{4}\right\rceil\right),$$

the symmetry of equation 8 does not hold for $s_u^{(N)}(k)$ is $N>L$.

In a more general embodiment of the present disclosure, circular time shifts of a general length d are performed in accordance with:

$$s_u^{(N)}(k) = \frac{1}{\sqrt{N}} \sum_{l=0}^{L-1} \tilde{H}_u(l) W_N^{-kl} W_L^{-ld}, \quad \text{(Eq. 17)}$$

where d is a positive or a negative integer such that the synchronization signal $s_u(k)$ is centrally asymmetric, $\tilde{H}_u(l)$ are centrally symmetric discrete Fourier frequency coefficients, where $\tilde{H}_u(l) = \tilde{H}_u(N-l)$, $l=0, 1, \ldots, L-1$, m is a positive integer $>1$, and $N=m\cdot L$. For instance, for a positive and a negative circular time shift of a quarter of the length of the signal $\tilde{s}_u(k)$, as in the example given above, $d=\lceil L/4 \rceil$ and $d=-(\lceil L/4 \rceil-1)$, respectively.

Correspondingly, this can also be performed by setting $m>1$ in equation 12. This also results in a number sequence $g_u(n)$ having properties such that a signal shape of the synchronization signal $s_u(k)$, generated by the mapping performed according to equation 13 and the following transformation, is maintained in samples of the synchronization signal $s_u(k)$ when it is downsampled.

As an example, for the case of downsampling such that L=64, the number sequence $g_u(n)$ is defined as:

$$g_u(n) = \begin{cases} W_{64}^{-16(n+33)} W_{63}^{un(n+1)/2} & n=0,1,\ldots,30 \\ W_{64}^{-16(n-30)} W_{63}^{u(n+1)(n+2)/2} & n=31,32,\ldots,61. \end{cases} \quad \text{(Eq. 18)}$$

In a receiver of the synchronization signal, typically a mobile terminal, the synchronization signal has to be detected in an efficient and non-complex manner. The detection is typically performed by correlating a received version of the synchronization signal with a replica of the synchronization signal, thereby resulting in a correlation peak for correct timing of the base station and the mobile terminal.

The design principle for a low-complex correlation receiver matched to synchronization signals generated according to the present disclosure is to add samples that are symmetric prior to multiplication with the known replica signal.

By the use of a synchronization signal according to the present disclosure, being a circular time shift of a centrally symmetric signal, it is easily realised that, for a full-length correlation, the number of symmetric sample pairs in the used synchronization signal is the same as for the centrally symmetric signal being shifted. Thus, for full-length correlation, the same computation complexity reduction, achieved by adding symmetric samples before the multiplication, can be performed for the synchronization signal according to the disclosure as for the centrally symmetric signal used in prior art. This is the case since the number of symmetric samples has not changed by the cyclic shift according to the present disclosure.

Thus, for a full-length correlation receiver according to an embodiment of the present disclosure, the computational complexity by the use of a synchronization signal according to equation 8 is the same as for a centrally symmetric signal. For odd N, the full length correlation can be computed as:

$$R_u(m) = \left| \sum_{k=0}^{N-1} r(m+k)s_u(k)^* \right| \quad \text{(Eq. 19)}$$

$$= \left| \begin{array}{l} \sum_{k=0}^{(N-1)/2-\lceil N/4 \rceil} (r(m+k)+r(m+N-2\lceil N/4 \rceil-k))s_u(k)^* + \\ \sum_{k=N-2\lceil N/4 \rceil+1}^{N-\lceil N/4 \rceil-1} (r(m+k)+r(m+2N-2\lceil N/4 \rceil-k))s_u(k)^* + \\ r(m+N-\lceil N/4 \rceil)s_u(N-\lceil N/4 \rceil)^* \end{array} \right|$$

and for even N:

$$R_u(m) = \left| \sum_{k=0}^{N-1} r(m+k)s_u(k)^* \right| \quad \text{(Eq. 20)}$$

$$= \left| \begin{array}{l} \sum_{k=0}^{(N-2)/2-\lceil N/4 \rceil} (r(m+k)+r(m+N-2\lceil N/4 \rceil-k))s_u(k)^* + \\ r(m+N/2-\lceil N/4 \rceil)s_u(N/2-\lceil N/4 \rceil)^* + \\ \sum_{k=N-2\lceil N/4 \rceil+1}^{N-\lceil N/4 \rceil-1} (r(m+k)+r(m+2N-2\lceil N/4 \rceil k))s_u(k)^* + \\ r(m+N-\lceil N/4 \rceil)s_u(N-\lceil N/4 \rceil)^* \end{array} \right|.$$

For other synchronization signals, being generated according to the present disclosure, by circular time shifts other than $\lceil N/4 \rceil$, as described above for the general embodiments of the present disclosure, full-length detection correlations corresponding to such shifts, utilizing symmetric sample pairs, are performed in a corresponding fashion as for $\lceil N/4 \rceil$. For such other circular time shifts, equations similar to equations 19 and 20, being adapted to those specific shifts, are used for the full length correlation.

For partial correlation of the received block of N samples, the samples should be partitioned into at least two consecutive parts, from which the partial correlations are computed.

Hereafter, for illustrative reasons, correlation performed on a partition into two consecutive blocks of a synchronization signal, being generated by a circular time shift of length $\lceil N/4 \rceil$ performed on a centrally symmetric signal, will be described. However, correlations performed on other partitions of the blocks or synchronization signals being generated by performing other circular time shifts on centrally symmetric signal, may be correlated in a corresponding fashion. Generally, the synchronization signal may be partitioned into essentially any number of blocks, and correlations according to the disclosure may be performed for each of these blocks. The present disclosure is below only exemplified for a partition into two consecutive blocks. However, a skilled person realizes that correlations for all such possible partitions and for all such generated signals can be performed in accordance with the present disclosure. Of course, the equations used for performing the correlations then have to be adapted in correspondence with these used partitions and signals.

When performing partial-length correlation on a synchronization signal of odd length N, optimal partitions of the synchronization signal are wanted. To reduce the effect of the frequency offsets, the different parts of the signal should not differ too much in size. For odd N, the difference in length of these two parts is at least one sample.

One possible partition of the signal is to maximize the number of symmetric pairs within each part, while the difference in length between the two parts is minimized.

Example 2

For N=9 of Example 1, the optimal partition is obtained:
$v_a$=[3443]
$v_b$=[21012],
and for N=11, the optimal partition is obtained:
$v_a$=[345543]
$v_b$=[21012].

According to an embodiment of the present disclosure, generalizing this to arbitrary odd N, the partition of the synchronization signal is obtained by:

$$v_a(k) = s_u(k), \quad k = 0, 1, \ldots, (N-3)/2 + p \quad \text{(Eq. 21)}$$

$$v_b(k) = s_u(k), \quad k = (N-1)/2 + p, \ldots, N-1,$$

where $$p = \begin{cases} 1, & \text{if remainder of } (N+1)/4 = 0 \\ 0, & \text{else}. \end{cases}$$

By adding the symmetric samples within the parts $v_a$ and $v_b$, respectively, the associated partial correlation of the partition according to equation 21 can be computed as:

$$R_u(m) = \left| \sum_{k=0}^{(N-3)/2+p} r(m+k)v_a(k)^* \right| + \quad \text{(Eq. 22)}$$

$$\left| \sum_{k=(N-1)/2+p}^{N-1} r(m+k)v_b(k)^* \right|$$

$$= \left| \sum_{k=0}^{(N-5)/4+p/2} (r(m+k)+r(m+(N-3)/2+p-k))s_u(k)^* \right| +$$

$$= \left| \begin{array}{l} \sum_{k=(N-1)/2+p}^{(3N-7)/4+p/2} (r(m+k)+r(m+N-k))s_u(k)^* + \\ r(m+3(N-1)/4+p/2) \\ s_u(3(N-1)/4+p/2)^* \end{array} \right|.$$

For even N, it is always possible to partition the signal into two parts of equal length:

$v_a(k)=s_u(k), k=0, 1, \ldots, N/2-1$ $v_b(k)=s_u(k), k=N/2, \ldots, N-1$ (Eq. 23)

However, as the following example shows, the partition according to equation 23 may not always maximize the number of symmetric samples within the parts.

Example 3

Consider the example N=12 from Example 1, partitioned into two parts of equal length:
$v_a$=[345654]
$v_b$=[321012].

It is clear however, that a partition that leads to more symmetric samples within each of the parts, respectively, is:

$v_a$=[3456543]
$v_b$=[21012].

According to an embodiment of the present disclosure, generalized to arbitrary even N, a partition that maximizes the number of symmetric samples within the parts, while minimizing the difference in length between the parts to at most two samples is:

$$v_a(k) = s_u(k), \quad k = 0, 1, \ldots, N/2 - 1 + p \quad \text{(Eq. 24)}$$
$$v_b(k) = s_u(k), \quad k = N/2 + p, \ldots, N - 1,$$

where $$p = \begin{cases} 1, & \text{if remainder of } N/4 = 0 \\ 0, & \text{else.} \end{cases}$$

By adding the symmetric samples within the parts $v_a$ and $v_b$, the associated partial correlation of the partition according to equation 24 can be computed as:

$$R(m) = \left| \sum_{k=0}^{(N-6)/4+p/2} r(m+k) + r(m+N/2-1+p-k)s_u(k)^* + r(m+(N-2)/4+p/2)s_u((N-2)/4+p/2)^* \right| + \left| \sum_{k=N/2+p}^{(3N-6)/4+p/2} (r(m+k) + r(m+N-k))s_u(k)^* + r(m+(3N-2)/4+p/2)s_u((3N-2)/4+p/2)^* \right|. \quad \text{(Eq. 25)}$$

For other synchronization signals, being generated according to the present disclosure, by circular time shifts other than [N/4], as described above for the general embodiments of the present disclosure, partial-length detection correlations corresponding to such shifts, utilizing symmetric sample pairs, are performed in a corresponding fashion as for shift [N/4]. For such circular time shifts, equations similar to equations 22 and 25, being adapted to those particular time shifts, are used for the partial-length correlation.

Figure 4:
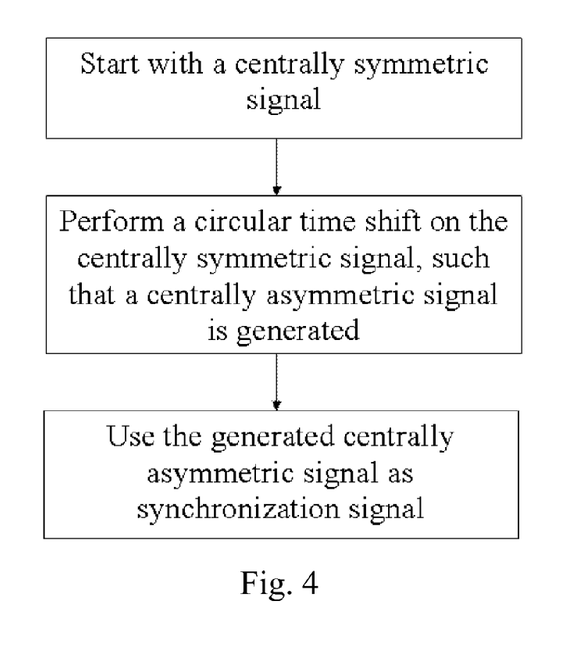
FIG. 4 shows an exemplary flow chart for generation of a synchronization signal according to the present disclosure.

FIG. 4 shows a flow diagram for a method of generating a synchronization signal according to an embodiment of the present disclosure. In a first block of the method, a centrally symmetric signal is used as a starting point for the method. In a second block, a circular time shift is performed on the centrally symmetric signal, such that a centrally asymmetric signal is generated. In a third block of the method, the generated asymmetric signal is used as a synchronization signal.

Figure 5:
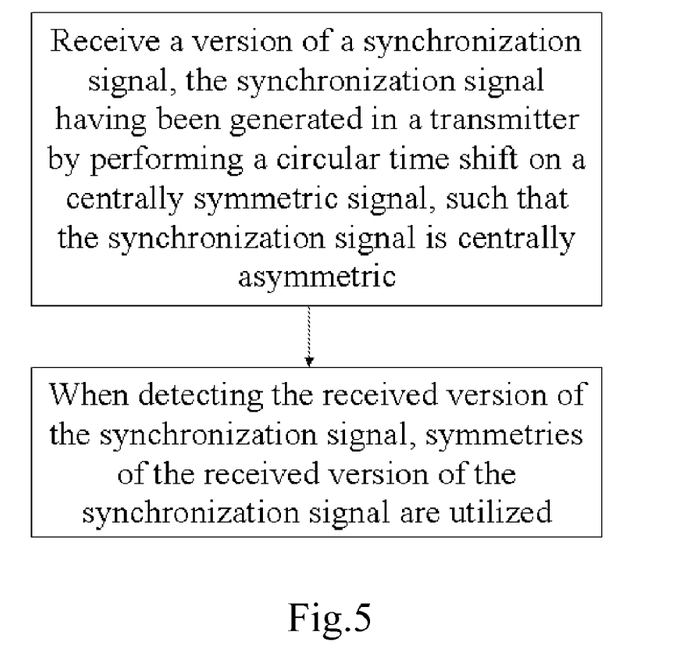
FIG. 5 shows an exemplary flow chart for detection of a synchronization signal according to the present disclosure.

FIG. 5 shows a flow diagram for a method of detecting a synchronization signal according to an embodiment of the present disclosure. In a first block of the method, a version of a synchronization signal is received. The synchronization signal is here a signal having been generated in a transmitter by performing a circular time shift on a centrally symmetric signal, such that the synchronization signal is centrally asymmetric. In a second block of the method, symmetries of the received version of the synchronization signal are utilized when detection of the synchronization signal is performed.

Further, the different blocks of the methods of the disclosure described above, i.e. all the different blocks for generating and detecting a synchronization signal according to the embodiments of the present disclosure, respectively, can be combined or performed in any suitable order. A condition for this, of course, is that the requirements needed for performing a block, to be used in conjunction with another block of the method of the disclosure, in terms of available signals, and so on, must be fulfilled.

Although the disclosure, throughout this document, has been described by be use of discrete signals, such as discrete synchronization signals, centrally symmetric signals and the like, the disclosure may also be implemented for continuous signals. When implementing the disclosure for continuous signals, of course, some of the discrete mathematical functions described in this document have to be substituted with continuous mathematical functions. For example, summations may be substituted by integrals.

The different steps of the methods for generating and detecting synchronization signals, respectively, according to the embodiments of the present disclosure can be implemented by the use of computer program, having code means, which when run in a computer causes the computer to execute the steps of the method. The computer program is included in a computer readable medium of a computer program product. The computer readable medium may consist of essentially any memory, such as a Read-Only Memory (ROM), a Programmable Read-Only Memory (PROM), an Erasable PROM (EPROM), a Flash memory, and an Electrically Erasable PROM (EEPROM), a hard disk drive.

Figure 6:
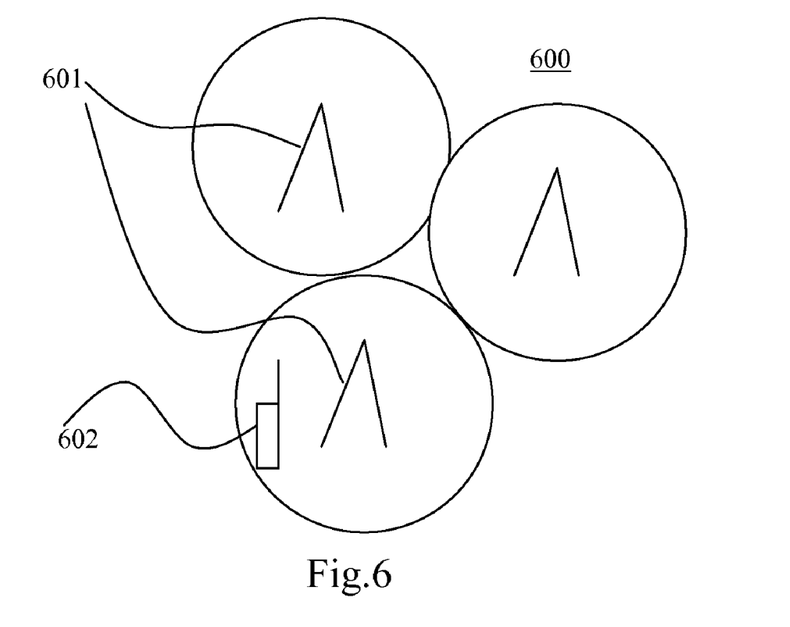
FIG. 6 shows an exemplary chart of a communication system according to the present disclosure.

Further, refer to FIG. 6, the present disclosure also includes apparatus, such as a base station 601, a mobile terminal 602 and a telecommunication system 600, for implementing the methods of the disclosure.

A base station 601 according the present disclosure, being a part of a telecommunication system 600, comprises a unit arranged for generating the synchronization signal by performing a circular time shift on a centrally symmetric signal such that the generated synchronization signal is centrally asymmetric.

The mobile terminal 602 according to the present disclosure comprises a unit arranged for detecting the synchronization signal by utilizing the symmetries of a received version r(m) of the synchronization signal to be detected.

Thereby, the base station makes it possible, by its generation of a synchronization signal having a favorable shape, for the mobile terminal, also being part of the telecommunication system, to utilize the symmetric sample pairs of the synchronization signal to reduce correlation complexity.

Thus, in the telecommunication system according to the present disclosure, the base station and the mobile terminal are arranged to be synchronized with each other by the use of the synchronization signal. The synchronization signal is transmitted from the base station and is detected by the mobile terminal. The base station comprises a unit arranged for generating the synchronization signal by performing a circular time shift on a centrally symmetric signal, where the circular time shift is arranged to be performed such that the generated synchronization signal is centrally asymmetric. The mobile terminal comprises a unit arranged for, when performing the detection, utilizing symmetries of a received version of the synchronization signal to be detected. By the present disclosure, the overall computation complexity in the system is reduced.

As is obvious for a skilled person in art, a number of other implementations, modifications, variations and/or additions can be made to the above described exemplary embodiments. It is to be understood that the disclosure includes all such other implementations, modifications, variations and/or additions which fall within the scope of the claims.

The invention claimed is:

1. A method of generating a synchronization signal for use in a telecommunication system, comprising:

generating a centrally asymmetric synchronization signal by performing a circular time shift on a centrally symmetric signal, wherein said circular time shift is performed in accordance with:

$s_u(k) = \tilde{s}_u(k+d)$, where $s_u(k)$ is said synchronization signal, k=0, 1, ..., N−1,
$\tilde{s}_u(k)$ is said centrally symmetric signal of length N, where $\tilde{s}_u(k)=\tilde{s}_u(k+p \cdot N)$, k=0, 1, ..., N−1, and p is an integer, and
d is an integer.

2. The method as claimed in claim 1, wherein d is a positive integer, d=⌈N/4⌉, or, said d is a negative integer, d=−(⌈N/4⌉−1), where ⌈N/4⌉ is the smallest integer equal to or greater than N/4.

3. The method as claimed in claim 1, wherein said generating comprises:
generating a number sequence $g_u(n)$ from a number sequence $d_u(n)$ being used to generate the centrally symmetric signal;
mapping the number sequence $g_u(n)$ on a centrally asymmetric set of discrete Fourier frequency coefficients $H_u(l)$, and
transforming said set of discrete Fourier frequency coefficients $H_u(l)$ into a discrete time representation constituting said synchronization signal.

4. The method as claimed in claim 3, wherein said mapping is performed in accordance with:

$$H_u(l) = \begin{cases} 0, & l = 0 \\ g_u(l+30), & l = 1, 2, \ldots, 31 \\ g_u(l-N+31), & l = N-31, \ldots, N-1 \\ 0, & \text{elsewhere,} \end{cases}$$

where
said number sequence $g_u(n)$ is of length 62, $g_u(n)$, n=0, 1, ..., 61, and
N is the number of Fourier frequency coefficients.

5. The method as claimed in claim 3, wherein said number sequence $g_u(n)$ is defined as:

$$g_u(n) = \begin{cases} W_L^{-d(n+33)} W_{63}^{un(n+1)/2} & n = 0, 1, \ldots, 30 \\ W_L^{-d(n-30)} W_{63}^{u(n+1)(n+2)/2} & n = 31, 32, \ldots, 61, \end{cases}$$

where
u is a number relatively prime to 63, and
$W_N=\exp(-j2\pi/N)$,
−L<d<L and d≠0,
N is the length of said centrally asymmetric synchronization signal,
N=m*L, and
m is an integer 1.

6. The method in claim 1, wherein said circular time shift is performed by modulating a centrally symmetric set of discrete Fourier frequency coefficients with a set of complex exponential functions, and a transformation of said centrally symmetric set of discrete Fourier frequency coefficients results in said centrally symmetric signal.

7. The method as claimed in claim 6, wherein said circular time shift being performed in accordance with:

$$s_u(k) = \frac{1}{\sqrt{N}} \sum_{l=0}^{N-1} H_u(l) W_N^{-kl},$$

where
$s_u(k)$ is said centrally asymmetric synchronization signal, k=0, 1, ..., N−1,
$H_u(l)=\tilde{H}_u(l)W_N^{-ld}$, d being an integer,
$W_N=\exp(-j2\pi/N)$,
$\tilde{H}_u(l)$ is the centrally symmetric set of discrete Fourier frequency coefficients, $\tilde{H}_u(l)=\tilde{H}_u(N-l)$, l=0, 1, ..., N−1,
N is the length of said centrally symmetric signal $\tilde{s}u(k)$, where $\tilde{s}_u(k)=\tilde{s}_u(k+p \cdot N)$, k=0, 1, ..., N−1 and p is an integer.

8. The method as claimed in claim 1, wherein said centrally asymmetric synchronization signal is constructed such that a signal shape of said centrally asymmetric synchronization signal is maintained at a sampling frequency resulting in less samples than the number of samples being generated when generating said centrally asymmetric synchronization signal.

9. The method as claimed in claim 8, wherein said circular time shift being performed in accordance with:

$$s_u^{(N)}(k) = \frac{1}{\sqrt{N}} \sum_{l=0}^{L-1} \tilde{H}_u(l) W_N^{-kl} W_L^{-ld},$$

where
$s_u^{(N)}(k)$ is said centrally asymmetric synchronization signal, k=0, 1, ..., mL−1,
$W_N=\exp(-j2\pi/N)$,
$\tilde{H}_u(l)$ are centrally symmetric set of discrete Fourier frequency coefficients, $\tilde{H}_u(l)=\tilde{H}_u(N-l)$, l=0, 1, ..., L−1,
N is the length of said centrally symmetric signal, being generated from $\tilde{H}_u(l)$, N=m·L,
m is a positive integer>1, and
d is an integer.

10. The method as claimed in claim 1, wherein said centrally asymmetric synchronization signal includes two parts, each of said two parts being symmetric within each part.

11. The method as claimed in claim 1, wherein said centrally symmetric signal $\tilde{s}_u(k)$ of length N is centrally symmetric if it fulfills the condition $\tilde{s}_u(k)=\tilde{s}_u(N-k)$, and said centrally asymmetric synchronization signal $s_u(k)$ of length N is centrally asymmetric if it fulfills the condition $s_u(k) \neq s_u(N-k)$; and/or
said centrally symmetric signal $\tilde{s}_u(k)$ of length N is centrally symmetric if it fulfills the condition $\tilde{s}_u(k)=\tilde{s}_u(N-1-k)$, and said centrally asymmetric synchronization signal $s_u(k)$ of length N is centrally asymmetric if it fulfills the condition $s_u(k) \neq s_u(N-1-k)$; and/or
said centrally symmetric signal $\tilde{s}_u(k)$ of length N is complex conjugate centrally symmetric if it fulfills the condition $\tilde{s}_u(k)=\tilde{s}_u(N-k)^*$, and said centrally asymmetric synchronization signal $s_u(k)$ of length N is complex conjugate centrally asymmetric if it fulfills the condition $s_u(k) \neq s_u(N-k)^*$, where "*" is a complex conjugate operator; and/or
said centrally symmetric signal $\tilde{s}_u(k)$ of length N is complex conjugate centrally symmetric if it fulfills the condition $\tilde{s}_u(k)=\tilde{s}_u(N-1-k)^*$, and said centrally asymmetric synchronization signal $s_u(k)$ of length N is complex conjugate centrally asymmetric if it fulfills the condition $s_u(k) \neq s_u(N-1-k)^*$, where "*" is a complex conjugate operator; and/or said centrally asymmetric synchronization signal $s_u^{(N)}(k)$ of length N is centrally asymmetric if it fulfills any of the conditions in the group: $s_u^{(L)}(k) \neq s_u^{(L)}(N-k)$, or $s_u^{(L)}(k) \neq s_u^{(L)}(N-1-k)$, and said centrally asymmetric synchronization signal $s_u^{(N)}(k)$ of length N is complex conjugate centrally asymmetric if it fulfills any of the conditions in the group: $s_u^{(L)}(k) \neq s_u^{(L)}(N-k)^*$, or $s_u^{(L)}(k) \neq s_u^{(L)}(N-1-k)^*$, where "*" is a complex conjugate operator.

12. A method of detecting a synchronization signal in a telecommunication system, comprising:
receiving a signal, and
detecting a centrally asymmetric synchronization signal from said received signal, wherein said centrally asymmetric synchronization signal is generated by performing a circular time shift on a centrally symmetric signal, wherein said circular time shift is performed in accordance with:

$s_u(k) = \tilde{s}_u(k+d)$, where
$s_u(k)$ is said centrally asymmetric synchronization signal, $k = 0, 1, \ldots, N-1$,
$\tilde{s}_u(k)$ is said centrally symmetric signal of length N, where $\tilde{s}_u(k) = \hat{s}_u(k + p \cdot N)$, $k = 0, 1, \ldots, N-1$, and p is an integer, and
d is an integer.

13. The method as claimed in claim 12, wherein said detecting comprises performing at least one correlation on at least one part of said received signal, said at least one part of said received signal being symmetric within its part.

14. The method as claimed in claim 12, wherein said detecting comprises performing two correlations on two consecutive parts of said received signal, each of said two consecutive parts being symmetric within its part.

15. The method as claimed in claim 14, wherein said performing two correlations comprises:
adding, for each part of said received signal, symmetric samples; and
performing, for added symmetric samples of each part of said received signal, one multiplication with one of two partial replica signals corresponding to said centrally asymmetric synchronization signal.

16. The method as claimed in claim 15, wherein, for said centrally asymmetric synchronization signal $s_u(k)$ being of odd length N, a replica signal corresponding to said centrally asymmetric synchronization signal $s_u(k)$ is being partitioned into two partial replica signals $v_a(k)$, $v_b(k)$ in accordance with:

$v_a(k) = s_u(k), k = 0, 1, \ldots, (N-3)/2 + p$ $v_b(k) = s_u(k), k = (N-1)/2 + p, \ldots, N-1$, where $$p = \begin{cases} 1, & \text{if remainder of } (N+1)/4 = 0 \\ 0, & \text{else;} \end{cases}$$

and/or
for said centrally asymmetric synchronization signal $s_u(k)$ being of even length N, a replica signal corresponding to said centrally asymmetric synchronization signal $s_u(k)$ is being partitioned into two partial replica signals $v_a(k)$, $v_b(k)$ in accordance with:

$v_a(k) = s_u(k), k = 0, 1, \ldots, N/2 - 1 + p$ $v_b(k) = s_u(k), k = N/2 + p, \ldots, N-1$, where $$p = \begin{cases} 1, & \text{if remainder of } N/4 = 0 \\ 0, & \text{else.} \end{cases}$$

17. Computer program product comprising a non-transitory computer readable medium and a computer program, wherein said computer program is included in the non-transitory computer readable medium, and said computer program comprises code means, the running of which causes the execution of the method according to claim 1.

18. A base station in a telecommunication system, comprising: a unit arranged for generating a centrally asymmetric synchronization signal by performing a circular time shift on a centrally symmetric signal, wherein said circular time shift is performed in accordance with:

$s_u(k) = \hat{s}_u(k+d)$, where $s_u(k)$ is said centrally asymmetric synchronization signal, $k = 0, 1, \ldots, N-1$,
$\hat{s}_u(k)$ is said centrally symmetric signal of length N, where $\hat{s}_u(k) = \hat{s}_u(k + p \cdot N)$, $k = 0, 1, \ldots, N-1$, and p is an integer, and
d is an integer.

19. A mobile terminal in a telecommunication system, comprising:
a unit arranged for receiving a signal, and
a unit arranged for detecting a centrally asymmetric synchronization signal from said received signal, wherein said centrally asymmetric synchronization signal is generated by performing a circular time shift on a centrally symmetric signal, wherein said circular time shift is performed in accordance with:

$s_u(k) = \hat{s}_u(k+d)$, where $s_u(k)$ is said centrally asymmetric synchronization signal, $k = 0, 1, \ldots, N-1$,
$\hat{s}_u(k)$ is said centrally symmetric signal of length N, where $\hat{s}_u(k) = \hat{s}_u(k + p \cdot N)$, $k = 0, 1, \ldots, N-1$, and p is an integer, and
d is an integer.

20. A telecommunication system comprising at least a base station and a mobile terminal, said base station and said mobile terminal being arranged to be synchronized with each other by the use of a centrally asymmetric synchronization signal being transmitted by said base station and detected by said mobile terminal, wherein
said base station comprises a unit arranged for generating said centrally asymmetric synchronization signal by performing a circular time shift on a centrally symmetric signal and
said mobile terminal comprises a unit arranged for detecting said centrally asymmetric synchronization signal, wherein said circular time shift is performed in accordance with:

$s_u(k) = \hat{s}_u(k+d)$, where $s_u(k)$ is said centrally asymmetric synchronization signal, $k = 0, 1, \ldots, N-1$,
$\hat{s}_u(k)$ is said centrally symmetric signal of length N, where $\hat{s}_u(k) = \hat{s}_u(k + p \cdot N)$, $k = 0, 1, \ldots, N-1$, and p is an integer, and
d is an integer.

* * * * *